(12) United States Patent
Haka

(10) Patent No.: US 6,960,146 B2
(45) Date of Patent: Nov. 1, 2005

(54) TORQUE RATIO CONTROL APPARATUS FOR A MULTI-SPEED TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/738,476

(22) Filed: Dec. 17, 2003

(65) Prior Publication Data

US 2005/0137055 A1  Jun. 23, 2005

(51) Int. Cl.$^7$ .......................................... F16H 31/00
(52) U.S. Cl. .................................................. 475/116
(58) Field of Search ........................ 475/137, 116, 127; 74/335

(56) References Cited

U.S. PATENT DOCUMENTS 6,350,213 B1 * 2/2002 Kirkwood ................... 475/116

* cited by examiner

Primary Examiner—Dirk Wright
(74) Attorney, Agent, or Firm—Leslie C. Hodges

(57) ABSTRACT

A control apparatus for a power transmission includes three linear actuator apparatuses, which are operable to supply fluid pressure to each of five torque-transmitting mechanisms in a power transmission. The linear actuator apparatuses are operable to control the ratio interchange within the power transmission during both upshifting and downshifting operations.

2 Claims, 1 Drawing Sheet

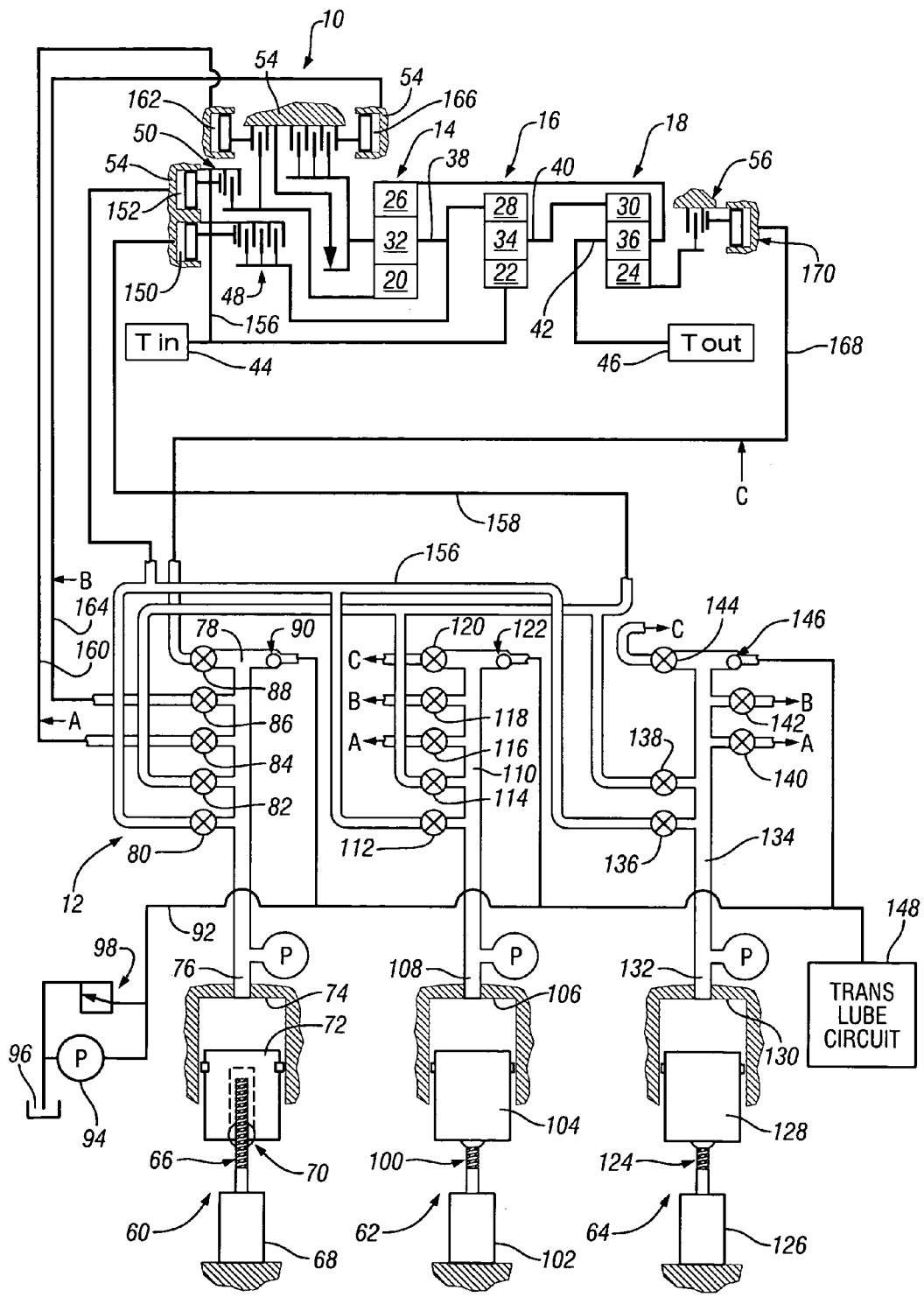

TORQUE RATIO CONTROL APPARATUS FOR A MULTI-SPEED TRANSMISSION

TECHNICAL FIELD

This invention relates to the controlling of ratios within a power transmission and, more particularly, to hydraulic apparatus for controlling the ratios in a multi-speed planetary transmission.

BACKGROUND OF THE INVENTION

Automatic shifting power transmissions generally include a hydraulic control system, which establishes the drive ratios within the power transmission. The drive ratios are controlled by fluid-operated friction torque-transmitting mechanisms, such as clutches and brakes. These clutches and brakes are controlled in specific sequences to establish the plurality of drive ratios required by an automatic shifting power transmission.

The drive ratios are interchanged by engaging one or more torque-transmitting mechanism while disengaging one or more others. These ratio interchanges are controlled by shift valves, and therefore a transmission generally will require a minimum number of shift valves equal to the "log base two of the total number of forward speeds" with fractional values rounded up to the next whole integer (i.e., an eight-speed transmission would need a minimum of three shift valves).

With the increase in the number of ratios made available in a power transmission, the complexity and size of the housing or the valve body in which the hydraulic control structure is arranged is becoming increasingly large and requiring more real estate within the transmission, thereby increasing the overall size of the transmission.

Typical automatic transmissions use a single pump to provide both hydraulic pressure for the clutches and lubrication. This pump is forced to run at elevated pressures at all times, which creates losses. This invention uses a sealed "hydrostatic" system with three separate drivers to provide pressure to five different clutches. The advantage of this type of system is the ability to trap the clutch pressure by closing a valve and then shutting off the power (electrical or mechanical) to the pressure source. This eliminates the pump losses and improves total system efficiency.

SUMMARY OF THE INVENTION

It is an object of the present invention to provide an improved control apparatus for a hydraulically controlled power transmission.

In one aspect of the present invention, three linear actuators are incorporated into a transmission control to establish the operating pressure for at least five torque-transmitting mechanisms.

In another aspect of the present invention, the transmission hydraulic control apparatus includes a pump supplying hydraulic fluid at a pressure level sufficient to establish lubrication within the transmission.

In yet another aspect of the present invention, the lubrication oil is also provided to the output of each of the linear actuators through one-way fluid transmitting mechanisms.

In still another aspect of the present invention, each of the linear actuators is operable to establish a high pressure sufficient to control the engagement of the torque-transmitting mechanisms within the transmission.

In a yet still another aspect of the present invention, each of the linear actuators has five electronically controlled valves for distributing fluid individually to each of five torque-transmitting mechanisms disposed within the transmission.

DESCRIPTION OF THE DRAWING

The drawing is a schematic representation of a portion of a hydraulic control circuit and a schematic representation of a power transmission having friction devices controlled by the hydraulic control apparatus.

DESCRIPTION OF AN EXEMPLARY EMBODIMENT

As seen in the drawing, a power transmission generally designated 10 has a hydraulic control apparatus generally designated 12. The power transmission 10 has three planetary gearsets 14, 16, and 18 having respective sun gear members 20, 22, and 24 and ring gear members 26, 28, and 30. Each of the sun gear members 20, 22, 24 and ring gear members 26, 28, and 30 are disposed in meshing relationship with a plurality of respective pinion gears 32, 34, and 36. The pinion gears 32, 34, and 36 are rotatably mounted on respective planet carrier members 38, 40, and 42.

The transmission 10 also includes an input shaft 44, an output shaft 46, two rotating torque-transmitting mechanisms or clutches 48 and 50, and three stationary torque-transmitting mechanisms or brakes 52, 54, and 56. The input shaft 44 is continuously connected with the sun gear member 22 and with the torque-transmitting mechanisms 48 and 50. The output shaft 46 is continuously connected with the planet carrier member 42 and the ring gear member 26.

The planet carrier member 38 and ring gear member 28 are connected with the torque-transmitting mechanism 48 and with the torque-transmitting mechanism 54. The sun gear member 20 is connected with the torque-transmitting mechanism 50 and the torque-transmitting mechanism 52. The sun gear member 24 is connected with the torque-transmitting mechanism 56.

During operation, when the torque-transmitting mechanism 48 is engaged, the planet carrier member 38 and ring gear member 28 are driven by the input shaft 44. When the torque-transmitting mechanism 50 is engaged, the sun gear member 20 is driven by the input shaft 44. Engagement of the torque-transmitting mechanism 52 will hold the sun gear member 20 stationary, engagement of the torque-transmitting mechanism 54 will hold the planet carrier member 38 and ring gear member 28 stationary, and the engagement of the torque-transmitting mechanism 56 will hold the sun gear member 24 stationary.

When the transmission is operating, simultaneous engagement of the torque-transmitting mechanisms 50 and 54 will produce a reverse ratio, simultaneous engagement of the torque-transmitting mechanisms 56 and 54 will produce a first forward speed ratio, simultaneous engagement of the torque-transmitting mechanisms 52 and 56 will produce a second forward speed ratio, simultaneous engagement of the torque-transmitting mechanisms 50 and 56 will provide a third forward speed ratio, simultaneous engagement of the torque-transmitting mechanisms 48 and 56 will provide a fourth forward speed ratio, simultaneous engagement of the torque-transmitting mechanisms 50 and 48 will provide a fifth forward speed ratio, and simultaneous engagement of the torque-transmitting mechanisms 52 and 48 will provide a sixth forward speed ratio.

In order to provide ratio interchanges in each single step ratio interchange, one torque-transmitting mechanism is disengaged while another is engaged. For example, on a first-to-second ratio interchange, the torque-transmitting mechanism 56 is disengaged while the torque-transmitting mechanism 52 is engaged. During a second-to-third ratio interchange, the torque-transmitting mechanism 52 is disengaged while the torque-transmitting mechanism 50 is engaged. During a third-to-fourth ratio interchange, the torque-transmitting mechanism 50 is disengaged while the torque-transmitting mechanism 48 is engaged. During a fourth-to-fifth ratio interchange, the torque-transmitting mechanism 56 is disengaged while the torque-transmitting mechanism 50 is engaged. During a fifth-to-sixth ratio interchange, the torque-transmitting mechanism 50 is disengaged while the torque-transmitting mechanism 52 is engaged.

The transmission 10 also has included therein a one-way torque-transmitting mechanism 58 disposed in parallel relationship with the torque-transmitting mechanism 54, such that a forward first speed can be engaged without the engagement of the torque-transmitting mechanism 54. When this mode of operation is employed, the engagement of the torque-transmitting mechanism 52 will cause the one-way torque-transmitting mechanism 58 to disengage and permit rotation of the planet carrier member 38 and ring gear member 28.

The engagement and disengagement of the torque-transmitting mechanisms 48, 50, 52, 54, and 56 are controlled by three linear actuator apparatus 60, 62, and 64. The linear actuator apparatus 60 includes a linear actuator 66, which employs an electric motor 68, a conventional ball screw actuator 70, and a piston 72, which is disposed in a cylinder 74. The cylinder 74 has a hydraulic passage 76 connected therewith, which is in turn connected with a manifold 78.

The manifold 78 is connected with electronically controlled valves 80, 82, 84, 86, and 88. Each of these valves, as will be explained later, communicates between the manifold 78 and one of the torque-transmitting mechanisms. The manifold 78 is also connected to a one-way valve 90 with a lube circuit or passage 92, which is supplied with low-pressure fluid by a hydraulic pump 94. The hydraulic pump 94 draws fluid from a reservoir 96 for distribution to the lube passage 92. A conventional regulator valve 98 maintains the low fluid pressure required in the passage 92.

The linear actuator apparatus 62 includes a linear actuator 100 having an electric motor 102, a ball screw actuator (not shown), a piston 104, and a hydraulic cylinder 106. The hydraulic cylinder 106 supplies fluid through a passage 108 to a manifold 110, which is connected with five electronically-controlled valves 112, 114, 116, 118, and 120. The manifold 110 is communicated with the lube passage 92 through a conventional one-way valve 122.

The linear actuator apparatus 64 includes a linear actuator 124 having an electric motor 126, a piston 128, a ball screw actuator (not shown), and a cylinder 130 in which the piston 128 is slidably disposed. The cylinder 130 distributes fluid through a passage 132 and a manifold 134, which is communicating with five electronically-controlled valves 136, 138, 140, 142, and 144. Also communicating with the manifold 134 is a conventional one-way valve 146, which in turn is communicated with the lube passage 92. The lube passage 92 also distributes fluid to a transmission lubrication circuit 148. As is well known, the lubrication circuit 148 will distribute fluid to the bearings and gears within the transmission to reduce the effects of friction.

The electronically-controlled valves 112, 114, 116, 118, and 120 as well as the electronically-controlled valves 136, 138, 140, 142, and 144 are each connected with respective ones of the torque-transmitting mechanisms 48, 50, 52, 54, and 56.

The torque-transmitting mechanisms 48 and 50 each have rotating input and output members with stationary actuating pistons 150 and 152, respectively. The pistons 150 and 152 are slidably disposed in a transmission housing 154 and have fingers extending through a rotating hub 156. The fingers are separated from the respective pistons by bearing mechanisms which permit relative rotation therebetween. The use of stationary pistons in rotating torque-transmitting mechanisms eliminates the use of rotating seal interfaces, which generally have a low leakage associated therewith. The present system requires a substantially sealed hydraulic system and seeks to provide a zero or absolute minimum fluid leakage past the seals of the actuating pistons for each of the torque-transmitting mechanisms. The linear actuators 66, 100, and 124 have a limited stroke and therefore have a limited amount of fluid that can be distributed under pressure to the various torque-transmitting mechanisms.

The electronically-controlled valves 80, 112, and 136 each communicate with a passage 157, which in turn communicates with the actuating piston 152 of the torque-transmitting mechanism 50. The electronically-controlled valves 82, 114, and 138 each communicate with a passage 158, which in turn communicates with the piston 150 of the torque-transmitting mechanism 48. The electronically-controlled valves 84, 116, and 140 each communicate with a passage 160, which in turn communicates with a piston 162 of the torque-transmitting mechanism 52. The electronically-controlled valves 86, 118, and 142 each communicate with a passage 164, which in turn communicates with a piston 166 of the torque-transmitting mechanism 54. The electronically-controlled valves 88, 120, and 144 each communicate with a passage 168, which in turn communicates with a piston 170 of the torque-transmitting mechanism 56.

The linear actuators and the electronically-controlled valves are each operatively controlled by a conventional electronic control unit (ECU), not shown. The ECU, as is well known, includes a digital computer, which is preprogrammable to establish the shift sequences and therefore torque-transmitting mechanism apparatus engagement and disengagement to establish the desired ratios within the power transmission.

For example, to establish the reverse speed ratio within the transmission, the linear actuator apparatus 64 is operated as is the electronically-controlled valve 136 to permit fluid pressure to be delivered to the torque-transmitting mechanism 50 thereby establishing an input drive to the sun gear member 20. Also, the linear actuator apparatus 62 is manipulated along with the electronically-controlled valve 118 to establish the engagement of the torque-transmitting mechanism 54 and therefore the grounding of the planet carrier member 38. This results in a reversal of rotation between the input shaft 44 and the output shaft 46.

Assuming the one-way torque-transmitting mechanism 58 is not used, a reverse-to-forward interchange is provided by manipulating the linear actuator apparatus 64 to release the torque-transmitting mechanism 50 while the linear actuator apparatus 60 is simultaneously actuating the torque-transmitting mechanism 56 through the electronically-controlled valve 88. The torque-transmitting mechanism 54 is retained engaged by the linear actuator apparatus 62.

To provide a first to second ratio interchange, the linear actuator apparatus 62 is operated to decrease the engagement of the torque-transmitting mechanism 54 while the linear actuator apparatus 64 is operated to control the engagement of the torque-transmitting mechanism 52, thereby establishing the second forward speed ratio.

To establish the third forward speed ratio, the linear actuator 62 is manipulated as is the electronically-controlled valve 112 to enforce the engagement of the torque-transmitting mechanism 50 while the torque-transmitting mechanism 52 is being disengaged. During the third-to-fourth ratio interchange, the linear actuator apparatus 62 is manipulated to disengage the torque-transmitting mechanism 50 while the linear actuator apparatus 64 is manipulated to control the engagement of the torque-transmitting mechanism 48 through the electronically-actuated valve 138.

The fourth-to-fifth ratio interchange is established with the disengagement of the torque-transmitting mechanism 56 by the linear actuator apparatus 60 and the engagement of the torque-transmitting mechanism 50 by the linear actuator apparatus 62 through the actuation of the electronically-controlled valve 112.

The fifth-to-sixth ratio interchange is accomplished with the disengagement of the torque-transmitting mechanism 50 under the control of the linear actuator apparatus 62 and the simultaneous engagement of the torque-transmitting mechanism 52 through the actuation of the linear actuator apparatus 60 and the actuation of the electronically-controlled valve 84.

Single ratio skip shifting is also possible with the present invention. For example, if a ratio skip shift from sixth-to-fourth or vice versa is desired, the electronic control unit (ECU) will recognize this and establish the disengagement of the torque-transmitting mechanism 52 through the use of linear actuator apparatus 60 and the engagement of the torque-transmitting mechanism 56 through the manipulation of the linear actuator apparatus 62 and the electronically-controlled valve 120. While this arrangement is different from the arrangement described above, the control permits such liberties within the system because each of the linear actuator apparatus 60, 62, and 64 can be made to control the actuation of each of the torque-transmitting mechanisms 48, 50, 52, 54, and 56.

It will be noted that when each ratio is established, one of the actuators is idle during that operation. This permits the electronic control system to do two things, either utilize the idle actuator to establish the engagement of the on-coming torque-transmitting mechanism or to swap places with either of the other actuators which will permit the swap actuator to be depressurized, if desired, to prepare for a skip shift when the electronic control unit suggests that such a manipulation or maneuver is desired. The idle actuator is also available to act as a "safety net" to re-establish pressure in the event of a slow leak that caused the primary actuator to go to maximum travel and ultimately loss the ability to achieve the desired pressure. This safety net would prevent a clutch from slipping, which would damage the transmission. In the event this safety net is ever activated, it would be desirable to warn the driver to get the transmission serviced before the problem grows.

What is claimed is:

1. A transmission control apparatus for controlling a plurality of torque-transmitting mechanisms in a power transmission comprising:

three linear actuator apparatus each having a linear actuator for supplying fluid pressure, each having a plurality of electronically-controlled valves for operatively connecting an output pressure of each said linear actuator with respective ones of said torque-transmitting mechanisms of said power transmission; and each said linear actuator apparatus being operated in combinations of two to establish a plurality of drive ratios within said power transmission.

2. A transmission control apparatus for controlling at least five torque-transmitting mechanisms in a power transmission comprising:

three linear actuator apparatus each having a linear actuator for supplying fluid pressure, each having a plurality of electronically-controlled valves for selectively operatively connecting an output pressure of each said linear actuator with respective ones of said torque-transmitting mechanisms of said power transmission, a first of said linear actuator apparatus being selectively connectable with at least three of said torque-transmitting mechanisms, a second of said linear actuator apparatus being selectively connectable with at least three of said torque-transmitting mechanisms at least two of which are not connectable with said first linear actuator apparatus, and a third of said linear actuator apparatus being selectively connectible with at least three of said torque-transmitting mechanisms at least one of which is not connectable with said first linear actuator apparatus and at least another of which is not connectable with said second linear actuator apparatus; and said linear apparatus being operated in combinations of at least two to enforce engagement of a plurality of combinations of said five torque-transmitting mechanisms to establish at least six drive ratios in said power transmission.

* * * * *